W. R. FOX.
FLEXIBLE SHAFT COUPLING.
APPLICATION FILED FEB. 18, 1919.

1,304,758. Patented May 27, 1919.

Inventor:
William R. Fox,
by Spear, Middleton, Donaldson & Spear
Atty's.

UNITED STATES PATENT OFFICE.

WILLIAM ROSS FOX, OF JACKSON, MICHIGAN.

FLEXIBLE SHAFT-COUPLING.

1,304,758.   Specification of Letters Patent.   Patented May 27, 1919.

Application filed February 18, 1919. Serial No. 277,760.

*To all whom it may concern:*

Be it known that I, WILLIAM R. Fox, a citizen of the United States, residing at Jackson, Michigan, have invented certain new and useful Improvements in Flexible Shaft-Couplings, of which the following is a specification.

The invention is designed for use in multiple drilling machines in which a number of flexible shafts are employed to drive the drills and it is desired to economize space by keeping the diameter of the flexible shafts and their universal joints down to a minimum.

My present invention is an improvement upon that disclosed in application for Letters Patent of the United States renewed December 15, 1917, Serial #206,852, and application filed February 20, 1917, Serial #149,795.

As in the applications referred to I employ in my improved construction a universal joint comprising a pair of members having forks engaging the core of a ball which is provided with circumferential grooves extending at right angles to each other and receiving the forks which are thus connected by the ball but are adapted to assume any necessary angular relation to each other, the ball transmitting motion from one to the other.

The object of the present invention is to provide a strong universal joint while maintaining the diameter of the joint to the desirable small limit.

The invention consists in the features and combination and arrangement of parts hereinafter described and particularly pointed out in the claims.

In these drawings 1 is the ball having the grooves 2, 2ª, extending about the same at right angles to each other leaving a core 3, with cylindrical surfaces 3ª and having flat spots at the points where the grooves intersect, one of which is shown at 3ᵇ.

The coupling members are indicated generally at A, B. Each comprises a fork portion marked respectively *a*, *b* and body portion, *a'*, *b'*, each body portion being cylindrical.

The fork portions are adapted in thickness to fit the circumferential grooves of the ball and they are retained in place by their arc shaped inner edge engaging the cylindrical surfaces at the bottoms of the grooves of the ball.

One of the fork members is provided with a gateway 4 which permits the other member to be turned to a position at right angles to the first mentioned member, because the gateway will receive one of the prongs of the fork portion and the members may be separated from each other by withdrawing the member which has been turned, the flat spots of the ball permitting this to be done.

This gateway tends to weaken the fork and to compensate for this I have devised the construction as now will be described.

Figure 8:
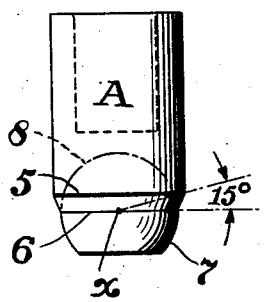
Fig. 8 is a side view of a blank from which the fork of Fig. 4 is formed.
Figure 7:
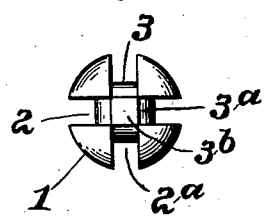
Fig. 7 is a view of the ball.
Figure 9:
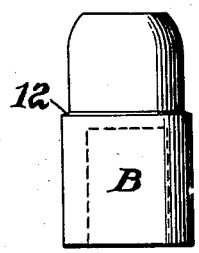
Fig. 9 is a side view of the blank from which the fork of Fig. 6 is formed.

As an example I take as a basis of computation a coupling member whose cylindrical portion or shank is 1″ in diameter. The ball I employ is say ¾″ in diameter. I first form a blank as shown in Fig. 8 with its shank portion extending the full diameter to the base line 5 of a beveled shoulder, this base line being located in relation to the center at *x* which is the point the center of the ball is to occupy so that it touches a radial line 15° above the center. The lower line 6 of the shoulder is at the level of the ball center. The lower reduced part of this blank is formed on a curve at 7 corresponding to the periphery of the ball.

Figure 1:
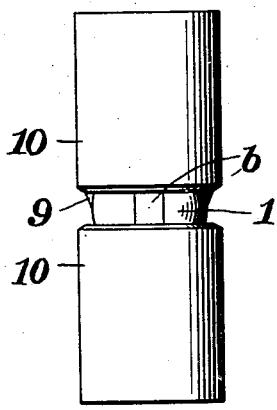
Figure 1 is a side view of the universal joint complete.
Figure 2:
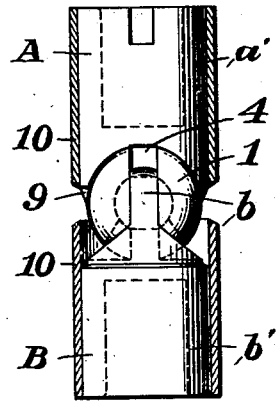
Fig. 2 is a side view of the coupling members with the outer sleeves in section.
Figure 3:
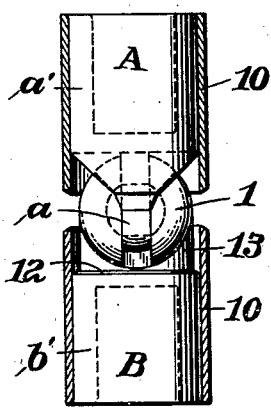
Fig. 3 is a view at a quarter turn from Fig. 2.
Figure 4:
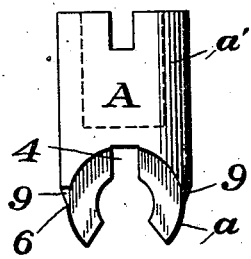
Fig. 4 is a side view of the fork member which has the gateway.
Figure 5:
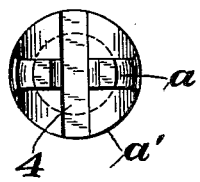
Fig. 5 is a plan view of the member of Fig. 4.
Figure 6:
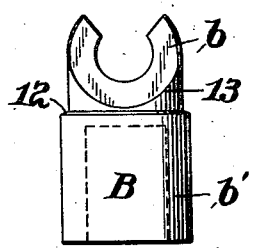
Fig. 6 is a side view of the other fork member, *i. e.*, the one which has no gateway.

With a circular milling cutter corresponding in diameter to that of the ball this blank is cut away on the dotted line 8 forming a recess at each side of the blank but leaving an intact portion which is to form the fork *a* when cut to the shape shown in Fig. 4. Each of these recesses has a cylindrical bottom portion at the side of the fork and the metal of the body portion or shank of the fork is left intact reaching at 9 to the line 6 or slightly beyond the same. This reinforce extends beyond the level of the mouth of the gateway and reinforces the fork and compensates for any weakness which otherwise would exist due to the presence of the gateway, it being noted that at the base line 5 of the shoulder there is still a material thickness of metal between the plane of the outer surface of the shank and the plane of the curve defining the ball recess.

These coupling members are supplied with sleeves 10 of an internal diameter equal to that of the external diameter of the shank and are forced thereon. These sleeves act as limiting stops to prevent the coupling members from assuming positions at right angles to each other, their adjacent edges coming together when a certain angular position is reached less than a right angle. The sleeves with this construction are of an internal diameter greater than that of the ball and thus additional space is provided for receiving and retaining lubricant.

The coupling member which has no gateway is formed with a fork portion which like that above described is of a diameter equal to that of the ball. The shank of this member is carried up of its full diameter only to the line 12 where it is provided with a beveled shoulder, the upper line of which is at or near the plane cut by the bottom of the ball recess formed by the circular cutter which leaves slight reinforcements at 13 but as this member has no gateway further reinforcing is not necessary.

I claim:

1. A coupling for flexible shafting comprising two members having cylindrical body or shank portions and fork portions, one of the members having a gateway at the bottom of its fork opening to receive the other fork member, a ball having circumferential grooves at right angles receiving said forks, said ball being of smaller diameter than the diameter of the fork shanks and the fork portions being equal in diameter to that of the ball, said gated member having an arc shaped recess at each side of its fork portion of a radius equal to that of the ball, leaving the metal of the shank reaching up and reinforcing the member at each side of the gateway, substantially as described.

2. A coupling for flexible shafting comprising two members, each having a cylindrical shank and a fork portion of reduced diameter with respect to the diameter of the shank, with arc shaped recesses at the sides of the fork portion, a groove ball of reduced diameter in respect to the diameter of the shank portion but equal in radius to that of the recess and fork portion, one of the members having a gateway at the base of its fork opening, the shank of said member being carried up at each side of said recesses and connecting by a shoulder with the fork portion at about the level of the ball center, substantially as described.

3. A coupling for flexible shafting comprising two members, each having a cylindrical shank portion and a fork portion of reduced radius in respect to the radius of the shank portion, a ball of reduced radius in respect to that of the shank and substantially equal to that of the fork portion, said ball being grooved at right angles to receive the fork, one of the forks having a gateway to permit the withdrawal or replacing of the other fork, each fork having a recess at its sides corresponding in radius to that of the ball, and sleeves, one for each member carried by the shanks thereof and of an internal diameter equal to the exterior diameter of the cylindrical shanks, said sleeve partly inclosing the ball and acting as stops to limit the angular positions of the coupling members, substantially as described.

4. A flexible shaft joint comprising a ball having grooves arranged at right angles to each other and intersecting, two members each having a fork to engage a groove of the ball and each having a cylindrical shank portion, the shank of one member having arc shaped recesses at opposite sides thereof bounded by terminal portions reaching up substantially to the plane of the ball center and the shank of the other member terminating substantially in the transverse plane at the periphery of the ball, substantially as described.

In testimony whereof, I affix my signature.

WILLIAM ROSS FOX.